Patented July 26, 1949

2,477,148

UNITED STATES PATENT OFFICE 2,477,148

2-ALKYL-5,5-DIMETHYL-$\Delta^2$-4-THIAZOLINE-CARBOXYLIC ACIDS AND PROCESS FOR PREPARING THE SAME John C. Sheehan, Rahway, Ralph Mozingo, Elizabeth, Karl Folkers, Plainfield, and Max Tishler, Rahway, N. J., assignors to Merck & Co., Inc., Rahway, N. J., a corporation of New Jersey No Drawing. Application March 22, 1946, Serial No. 656,512

4 Claims. (Cl. 260—302)

This invention relates to the preparation of dl-penicillamine and related compounds which are useful as intermediates in the synthesis of penicillin and chemically related substances having antibiotic activity, and particularly to processes for preparing such compounds from new intermediates obtained from readily available starting materials such as dl-valine and dimethylacrylic acid.

d-Penicillamine has been prepared from penicillin by hydrolyzing a salt of penicillin with hot dilute mineral acid (Nature 151, 107 (January 23, 1943)). It has been determined that the product thus obtained is an α-amino acid of the d or "unnatural" series having a structure fully defined by the chemical names d-α-amino-β-mercaptoisovaleric acid or d-β,β-dimethyl cysteine.

It is now discovered, in accordance with the present invention, that penicillamine can be prepared readily and in good yield from certain new intermediate compounds such as 2-alkyl-4-isopropylidene-5(4)-oxazolones, their hydration products α-acylamino-β,β-dimethylacrylic acids, and esters thereof, by reacting such a compound with absolute methanol saturated with hydrogen sulfide, and preferably containing dissolved sodium methoxide, neutralizing the reaction mixture with anhydrous mineral acid, removing the solvent under reduced pressure, hydrating the 2-alkyl-5,5-dimethyl-$\Delta^2$-4-thiazoline carboxylic acid or ester thus formed to N-acyl-dl-penicillamine or an ester thereof, and converting the same to a dl-penicillamine hydrohalide and to free dl-penicillamine by reacting with aqueous hydrohalic acid and then reacting the hydrohalide, under anhydrous conditions, with pyridine.

The starting materials can be prepared from dl-valine by converting the same to an N-α-haloacyl derivative, forming a salt or addition compound of the N-α-haloacyl derivative with a nitrogenous heterocyclic compound having a pyridine nucleus, and converting the same to a 2-alkyl-4-isopropylidene-5(4)-oxazolone or to hydration products such as a α-acylamino-β,β-dimethylacrylic acid and esters thereof in accordance with a procedure fully disclosed in a co-pending joint application of two of the present applicants, Mozingo, Folkers and Easton, Serial No. 656,511, filed March 22, 1946.

An alternate procedure for preparing said hydration products, by reacting dimethylacrylic acid with mercuric acetate, treating the addition product thus formed with a brominating agent and then with aqueous ammonium hydroxide to form α-amino-β-methoxyisovaleric acid, reacting the same with an acyl anhydride to form α-acylamino-β,β-dimethylacrylic acid, is disclosed in a co-pending joint application of two of the present applicants, Mozingo and Folkers, Serial No. 656,510 filed March 22, 1946, Patent Number 2,460,708.

It is also discovered, in accordance with the present invention that 2-methyl-4-isopropylidene-5(4)-oxazolone can be prepared by reacting α-amino-β-methoxyisovaleric acid with acetic anhydride and triethyl amine and removing solvents from the reaction mixture under reduced pressure as more fully hereinafter disclosed.

In carrying out the process of the present invention, a 2-alkyl-4-isopropylidene-5(4)-oxazolone or a corresponding hydration product, prepared by any of the procedures outlined above, is dissolved in absolute methanol and added slowly to absolute methanol saturated at about 0° C. with hydrogen sulfide. It is also advantageous, though not absolutely necessary, that the methanol-hydrogen sulfide solution contain dissolved sodium methoxide. During the addition, which takes about one to one and one-half hours, and for about sixteen hours thereafter hydrogen sulfide is passed through the reaction mixture and the temperature is gradually increased to about room temperature. The reaction mixture is then neutralized with anhydrous methanolic hydrogen chloride and the solvent is removed by heating (to about 40° C.) under reduced pressure, yielding a crude 2-alkyl-5,5-dimethyl-$\Delta^2$-4-thiazolinecarboxylic acid or ester thereof.

This can be purified by dissolving in ether and quickly filtering to remove sodium chloride. Upon standing, the product crystallizes from the ether filtrate and can be further purified by recrystallization from benzene. The thiazoline is quantitatively converted to N-acyl-dl-penicillamine by warming with water.

In carrying out the process to prepare dl-penicillamine and related compounds, it is not necessary to isolate the thiazoline compound. The crude mixture obtained after neutralization and evaporation of solvent as above described can be merely warmed with water and chilled to cause crystallization of the N-acyl-dl-penicillamine, which is recovered by filtration. The N-acyl-dl-penicillamine is purified by recrystallization from hot water.

N-acyl-dl-penicillamine is converted to dl-penicillamine, preferably through a hydrohalide of dl-penicillamine, by reacting with an aqueous hydrohalic acid in an oxygen-free (nitrogen) atmosphere, as by refluxing with hydrochloric acid for about sixteen hours, concentrating and drying the reaction mixture, and crystallizing the dl-penicillamine hydrohalide by trituration with dry ether. When the hydrohalide is dissolved in absolute methanol, treated with pyridine, and the reaction mixture is then cooled to about 0° C., dl-penicillamine crystallizes out and is recovered by filtration.

The following is a graphic representation of the procedure above described using as a starting material 2-methyl-4-isopropylidene-5(4)-oxazolone:

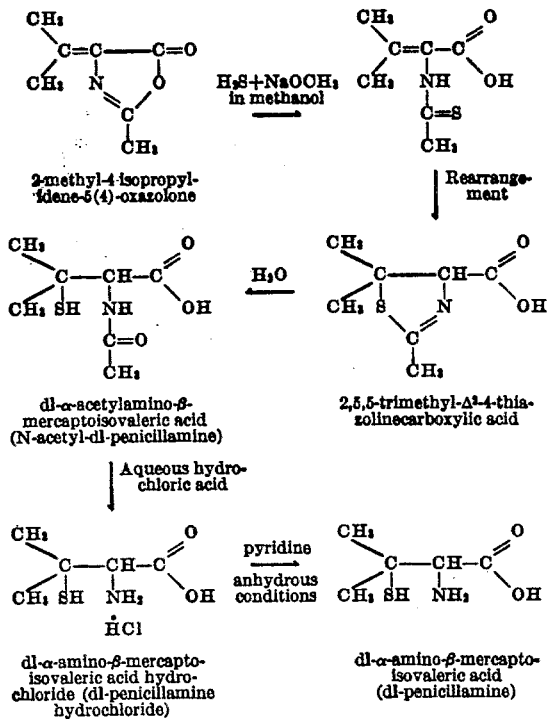

The following examples illustrate methods of carrying out the present invention, but it will be understood that these examples are given by way of illustration and not of limitation.

*Example I*

A mixture of 73.5 g. of α-amino-β-methoxyisovaleric acid, 180 ml. of acetic anhydride, and 1 ml. of triethylamine was warmed on a steam bath for one-half hour. After removal of solvents under reduced pressure, the residue crystallized as crude 2-methyl-4-isopropylidene-5(4)-oxazolone. The product is suitable for use without further purification. Upon recrystallization from 30–60° petroleum ether, 63.5 g. (94%) of the azlactone was recovered having a melting point of 37–38° C. A sample was evaporatively distilled at 70° and 0.01 mm. and analyzed immediately.

Calculated for $C_7H_9O_2N$: C, 60.42; H, 6.52.
Found: C, 60.34; H, 6.21.

*Example II*

A solution of 0.6 g. of sodium in 100 ml. of absolute methanol was saturated at 0° with hydrogen sulfide. Over a period of one hour, a solution of 2-methyl-4-isopropylidene-5(4)-oxazolone in 40 ml. of methanol was added. During the addition and for sixteen hours thereafter, a stream of hydrogen sulfide was allowed to pass through the solution, the temperature being gradually increased to 25°.

After neutralization with 2.2 ml. of methanol containing 0.46 g. of dry hydrogen chloride per ml., the solvent was removed (40°) under reduced pressure. The residual amber syrup was dissolved in dry ether and quickly filtered from sodium chloride. The filtrate soon crystallized, yielding 7.2 g. of colorless needles, M. P. 126–130°. By recrystallization from benzene the melting point was raised to 130–132°. This product, 2,5,5-trimethyl-$\Delta^2$-4-thiazolinecarboxylic acid, contains sulfur, gives a negative ferric chloride test for the sulfhydryl group, and dissolves in a sodium bicarbonate solution with effervescence.

Analysis:
Calculated for $C_7H_{11}O_2NS$: C, 48.53; H, 6.40; N, 8.07.
Found: C, 48.81; H, 6.10; N, 7.91.

This thiazoline is rapidly and quantitatively converted to N-acetyl-dl-penicillamine by warming in water for several minutes.

*Example III*

A solution of the crude azlactone, prepared from 73.5 g. of α-amino-β-methoxyisovaleric acid as in Example I, in 85 ml. of methanol was added in one and one-half hours to a solution of 1.77 g. of sodium in 292 ml. of methanol saturated with hydrogen sulfide at 0°. A stream of hydrogen sulfide was allowed to pass through the solution during the addition and for sixteen hours thereafter, the temperature gradually being increased to 25°. After neutralization with 6.3 ml. of methanol containing 0.43 g. of hydrogen chloride per ml., the solvent was removed under reduced pressure. The amber syrup was warmed (90°) with 200 ml. of water for ten minutes, then chilled and filtered, yielding 75.5 g. (80% overall) of N-acetyl penicillamine; M. P. 175–177° (dec.).

This product, when recrystallized from hot water, was recovered as glistening colorless needles melting at 183° C.

Analysis:
Calculated for $C_7H_{13}O_3NS$: C, 43.91; H, 6.55; N, 7.33.
Found: C, 43.97; H, 6.98; N, 7.06.

*Example IV*

A mixture of 20 g. of recrystallized N-acetyl penicillamine, 210 ml. of 2.5 N hydrochloric acid and 105 ml. of water was refluxed sixteen hours under nitrogen. A trace of hydrogen sulfide was evolved. After concentration under reduced pressure, the syrup was dried by flushing twice with absolute alcohol and once with benzene under reduced pressure. The residue crystallized readily on trituration with dry ether, yielding 19.6 g. (100%) of dl-penicillamine hydrochloride; M. P. 145–148° (dec.). The purity as determined by iodine titration was 96–98%.

*Example V*

A solution of the aforementioned penicillamine hydrochloride (18.6 g.) in 28 ml. of absolute alcohol was clarified by centrifuging. After the addition of 15 ml. of pyridine and cooling to 0°, dl-penicillamine was filtered off, weight 9.70 g. (65%); M. P. 201–202° (dec.), undepressed with authentic penicillamine. The filtrate was concentrated to a syrup, dissolved in 15 ml. of water and made alkaline with 30% sodium hydroxide. After concentration under reduced pressure, the last traces of pyridine were removed with ether.

The mixture was acidified with hydrochloric acid, concentrated to dryness, flushed with absolute alcohol and dissolved in absolute alcohol. Subsequent removal of sodium chloride and neutralization as before with pyridine afforded an additional 1.66 g. of penicillamine; M. P. 201° (dec.). The total yield overall from N-acetyl penicillamine was 77%.

Modifications may be made in carrying out the present invention without departing from the spirit and scope thereof, and our invention is to be limited only by the appended claims.

We claim:

1. The process that comprises reacting a 2-lower alkyl-4-isopropylidene-5(4)-oxazolone with an absolute methanol solution of sodium saturated with hydrogen sulfide, neutralizing the reaction mixture with anhydrous mineral acid, evaporating the solvent under reduced pressure, dissolving the residue in dry ether, filtering, and crystallizing from the filtrate the corresponding 2-lower alkyl - 5,5 - dimethyl-$\Delta^2$-4-thiazoline carboxylic acid.

2. The process that comprises reacting 2-methyl-4-isopropylidene-5(4)-oxazolone with an absolute methanol solution of sodium saturated with hydrogen sulfide, neutralizing the reaction mixture with anhydrous hydrogen chloride, evaporating the solvent under reduced pressure, dissolving the residue in dry ether, filtering, and crystallizing from the filtrate 2,5,5-trimethyl-$\Delta^2$-4-thiazolinecarboxylic acid.

3. A 2-lower alkyl-5,5-dimethyl-$\Delta^2$-4-thiazoline carboxylic acid.

4. 2,5,5-trimethyl - $\Delta^2$ - 4-thiazolinecarboxylic acid.

JOHN C. SHEEHAN.
RALPH MOZINGO.
KARL FOLKERS.
MAX TISHLER.

REFERENCES CITED

The following references are of record in the file of this patent:

UNITED STATES PATENTS

| Number | Name | Date |
|---|---|---|
| 743,986 | Nicolaier et al. | Nov. 10, 1903 |
| 2,375,885 | Babcock | May 15, 1945 |
| 2,391,993 | Mathes | Jan. 1, 1946 |

OTHER REFERENCES

Carter: "J. Biol. Chem.," vol. 139 (1941), pp. 247–254.

Pirie: "Biochem. J.," vol. 25 (1931), pp. 615 and 618.

Fruton: "J. Biol. Chem.," vol. 106 (1934), pp. 673 and 689.

Neuberger: "Biochem. J.," vol. 32 (1938), pp. 1452 and 1455.

Merck: Report 26, "Synthetic Studies on Penicillamine," April 1944, pages 1 to 6.

Pfizer & Co. Report No. 8, "Chemical Studies on Penicillin," Feb. 1944, page 9. Copies available in Div. 59.

Nicolet: "J. Biol. Chem.," vol. 95 (1932), page 390.

Upjohn Report U-13b (page 24), Oct. 16, 1944, CPS-322.

Merck Report XIId (page 4), Feb. 18, 1944, CPS-134.

Abbott: A-XII, pages 4-5, Sept. 15, 1945, CPS-295.

Squibb: S-XXIV (page 7), Aug. 1, 1944, CPS-232.